(12) United States Patent
Connaughton et al.

(10) Patent No.: US 12,471,951 B2
(45) Date of Patent: Nov. 18, 2025

(54) CONTROL HANDLE FOR AN ATHERECTOMY DEVICE

(71) Applicant: CLEARSTREAM TECHNOLOGIES LIMITED, Enniscorthy (IE)

(72) Inventors: Eoin Connaughton, Enniscorthy (IE); Allan Ronan, Enniscorthy (IE); Artur Spodobalski, Blackwater (IE)

(73) Assignee: Clearstream Technologies Limited, Enniscorthy (IE)

( * ) Notice: Subject to any disclaimer, the term of this patent is extended or adjusted under 35 U.S.C. 154(b) by 0 days.

(21) Appl. No.: 18/260,904

(22) PCT Filed: Apr. 6, 2022

(86) PCT No.: PCT/EP2022/059080
§ 371 (c)(1),
(2) Date: Jul. 10, 2023

(87) PCT Pub. No.: WO2023/193895
PCT Pub. Date: Oct. 12, 2023

(65) Prior Publication Data
US 2024/0216007 A1    Jul. 4, 2024

(51) Int. Cl.
*A61B 17/3207*    (2006.01)
*A61B 17/00*    (2006.01)
*A61B 17/32*    (2006.01)

(52) U.S. Cl.
CPC ........ *A61B 17/320758* (2013.01); *A61B 2017/00398* (2013.01); *A61B 2017/00407* (2013.01); *A61B 2017/320008* (2013.01)

(58) Field of Classification Search
CPC .. A61B 17/320758; A61B 2017/00398; A61B 2017/00407; A61B 2017/320008; A61B 2017/320766
See application file for complete search history.

(56) References Cited

U.S. PATENT DOCUMENTS

| | | | |
|---|---|---|---|
| 5,467,684 A * | 11/1995 | Sher | F01B 3/0079 74/129 |
| 5,925,055 A * | 7/1999 | Adrian | A61B 17/2202 606/171 |
| 5,972,012 A * | 10/1999 | Ream | A61B 17/32002 604/22 |
| 6,102,926 A * | 8/2000 | Tartaglia | A61B 17/3207 600/564 |
| 6,221,087 B1 | 4/2001 | Anderson | |

(Continued)

OTHER PUBLICATIONS

International Search Report and Written Opinion for Appl. No. PCT/E P2022/059080, mailed Nov. 7, 2022, 16 pages.

(Continued)

*Primary Examiner* — Anh T Dang
(74) *Attorney, Agent, or Firm* — Dinsmore & Shohl LLP

(57) ABSTRACT

A control handle for an atherectomy device comprising a housing and a drive module for rotating an abrasive head of the atherectomy device. The drive module is moveable relative to the housing in a longitudinal stroke motion. The control handle further comprises a rotary indexing mechanism connected to the drive module. The rotary indexing mechanism is configured to rotate the drive module by a pre-determined amount after a longitudinal stroke.

31 Claims, 5 Drawing Sheets

(56) References Cited

U.S. PATENT DOCUMENTS

| | | |
|---|---|---|
| 6,852,118 B2 | 2/2005 | Shturman et al. |
| 7,892,186 B2 | 2/2011 | Soukup et al. |
| 9,198,679 B2 | 12/2015 | To et al. |
| 9,833,258 B2 | 12/2017 | Kusleika |
| 10,352,411 B2 | 7/2019 | Fojtik |
| 11,000,307 B2 | 5/2021 | Fojtik |
| 2005/0209610 A1* | 9/2005 | Carrison .............. A61B 17/221 606/114 |
| 2011/0087254 A1 | 4/2011 | Welty |
| 2014/0222046 A1* | 8/2014 | Schneider ...... A61B 17/320783 606/159 |
| 2016/0361080 A1 | 12/2016 | Grace |
| 2017/0087348 A1 | 3/2017 | Mcarthur |
| 2018/0092633 A1* | 4/2018 | Peliks ................ A61B 10/0266 |
| 2020/0289150 A1 | 9/2020 | Masubuchi et al. |
| 2021/0386451 A1 | 12/2021 | Escudero |

OTHER PUBLICATIONS

Communication pursuant to Article 94(3) EPC corresponding to Application No. 22 721 020.0-1111, dated Sep. 15, 2025.

\* cited by examiner

CONTROL HANDLE FOR AN ATHERECTOMY DEVICE

CROSS-REFERENCE TO RELATED APPLICATIONS

This application is a National Stage Entry, under 35 U.S.C. § 371, of International Patent Application No. PCT/EP2022/059080, filed Apr. 6, 2022, the entirety of which is hereby incorporated by reference.

TECHNICAL FIELD

The present invention relates to a control handle for an atherectomy device, an atherectomy device for cutting or abrading tissue, and a method of cutting or abrading tissue using an atherectomy device.

BACKGROUND

Atherosclerosis is a condition where calcified plaque deposits in the walls of a blood vessel lead to narrowing of the blood vessel and increased blood pressure. In severe cases, this can result in peripheral artery disease, coronary artery disease, tissue death or stroke.

Atherosclerosis can be treated in a number of ways such as by angioplasty, where a balloon is used to force the expansion of the blood vessel to allow improved blood flow, a vascular bypass, where a surgical procedure is performed to redirect the blood flow to circumvent the diseased area of the blood vessel, or atherectomy.

Atherectomy is a non-surgical procedure to open blocked blood vessels using a device at the distal end of a catheter to cut or grind atherosclerotic plaque from the walls of the blood vessel. Atherectomy devices can generally be classified into four different types: orbital, rotational, laser and directional.

A rotational atherectomy device uses a rotating abrasive head to cut or grind the atherosclerotic plaque from the walls of the blood vessel. A number of existing rotational atherectomy devices, for example the devices described in US 2008/0004643 A1 and US 2021/0386451 A1, incorporate a catheter having an abrasive head of fixed diameter. In order to treat larger diameter vessels, the abrasive head can be offset or tilted towards one side of the vessel wall and the lesion is treated with multiple axial passes, where after each pass a physician must manually rotate the catheter. This manual rotation of the catheter can be inaccurate and also time-consuming.

There is hence a need in the art for a new type of control handle for an atherectomy device which can accurately and quickly rotate an atherectomy catheter by a set amount to provide more effective and accurate treatment of a lesion and reduce the overall treatment time.

SUMMARY

In a first aspect of the present disclosure, there is provided a control handle for an atherectomy device comprising a housing and a drive module for rotating an abrasive head of the atherectomy device. The drive module is moveable relative to the housing in a longitudinal stroke motion. The control handle further comprises a rotary indexing mechanism connected to the drive module. The rotary indexing mechanism is configured to rotate the drive module by a pre-determined amount after a longitudinal stroke.

In some embodiments, this may result in a control handle which can accurately and quickly rotate an atherectomy catheter by a set amount to provide more effective and accurate treatment of a lesion and reduce the overall treatment time.

Throughout this disclosure, the term "longitudinal stroke motion" is used to denote a forward and return movement in a longitudinal direction. A "longitudinal stroke motion" may comprise a distal stroke and a proximal stroke, or vice versa.

The rotary indexing mechanism may comprise a stepper motor for rotating the drive module and a microswitch for activating the stepper motor.

In some embodiments, this may result in an automatic and accurate rotation of the drive module by a pre-determined amount.

The microswitch may be positioned such that it is triggered by a portion of the housing after a longitudinal stroke.

The housing may comprise an internal protrusion for contacting and triggering the microswitch after a longitudinal stroke.

In some embodiments, this may provide and simple and effective way to activate the stepper motor after a longitudinal stroke.

The internal protrusion may be positioned to trigger the microswitch at the end of a proximal stroke.

In some embodiments, this may result in the catheter being rotated by a pre-determined amount when the abrasive head is positioned at a proximal end of a lesion.

Throughout this disclosure, the term "proximal stroke" refers to a movement from a distal point to a proximal point. A "distal stroke" refers to a movement from a proximal point to a distal point. A "longitudinal stroke motion" may comprise a distal stroke followed by a proximal stroke, or vice versa.

The rotary indexing mechanism may comprise a cam track and follower.

In some embodiments, this may result in a control handle which can accurately rotate an atherectomy catheter in a mechanical manner by a pre-determined amount to provide more effective and accurate treatment of a lesion and reduce the overall treatment time.

The cam track may be disposed on the drive module.

In some embodiments, this may provide a simple and effective way to allow the drive module to rotate by a pre-determined amount.

The follower may be fixed to the inside of the housing.

In some embodiments, this may provide a simple and effective way to allow the drive module to rotate by a pre-determined amount relative to the housing.

The follower may comprise a protrusion which engages with the cam track.

The cam track may comprise a plurality of longitudinal straight portions and a plurality of v-shaped portions.

In some embodiments, this may allow the abrasive head to move longitudinally along the lesion before being rotated by a pre-determined amount.

Each longitudinal straight portion may be connected to an adjacent longitudinal straight portion through a v-shaped portion.

In some embodiments, this may allow the abrasive head to move longitudinally along the lesion before being rotated by a pre-determined amount.

Each of the plurality of v-shaped portions may be disposed at the distal end of one of the plurality of longitudinal straight portions.

In some embodiments, this may result in the drive module rotating by a pre-determined amount after a proximal stroke.

The cam track may comprise a one-way gate at one or more points where one of the v-shaped portions connects to one of the longitudinal straight portions.

In some embodiments, this may help to rotate the drive module in the same direction after each longitudinal stroke.

The cam track may comprise a one-way gate at each point where one of the v-shaped portions connects to one of the longitudinal straight portions.

In some embodiments, this may help to rotate the drive module in the same direction after each longitudinal stroke.

The cam track may comprise a one-way gate at the tip of at least one of the plurality of v-shaped portion.

In some embodiments, this may help to rotate the drive module in the same direction after each longitudinal stroke.

The cam track may comprise a one-way gate at the tip of each of the plurality of v-shaped portion.

In some embodiments, this may help to rotate the drive module in the same direction after each longitudinal stroke.

The rotary indexing mechanism may comprise a ratchet and a pawl.

In some embodiments, this may result in a control handle which can accurately rotate an atherectomy catheter in a mechanical manner by a set amount to provide more effective and accurate treatment of a lesion and reduce the overall treatment time.

The ratchet may be fixed to the drive module and the pawl may be disposed in the housing.

In some embodiments, this may allow the drive module to rotate relative to the housing by a pre-determined amount.

The ratchet may comprise a plurality of teeth for engaging with the pawl.

In some embodiments, this may provide a secure engagement between the ratchet and the pawl.

The pawl may be configured to be released from the ratchet at the end of a longitudinal stroke to allow the drive module to rotate by the pre-determined amount.

The rotary indexing mechanism may further comprise a torsion spring mechanism for rotating the drive module.

In some embodiments, this may provide an effective mechanical mechanism for rotating the drive module.

The pawl may comprise a longitudinal pawl rail and a pivotable element.

In some embodiments, this may provide for an effective way to longitudinally advance the atherectomy catheter and rotate it by a pre-determined amount after a longitudinal stroke.

The pivotable element may be disposed at the proximal end of the longitudinal pawl rail.

In some embodiments, this may allow the atherectomy catheter to be rotated by a pre-determined amount at end of a proximal stroke.

The pivotable element may be configured to pivot and release the ratchet at the end of a longitudinal stroke to allow the drive module to rotate by the pre-determined amount.

The control handle may further comprise a pusher element extending at least partly outside the housing and configured to move the drive module in a longitudinal stroke motion.

In some embodiments, this may provide an effective mechanism for advancing and retracting the atherectomy catheter.

The pusher element may be connected to the drive module.

The pre-determined amount of rotation may be in the range of 5 degrees to 90 degrees, preferably 10 degrees to 60 degrees.

In some embodiments, this will provide a thorough treatment of the lesion while keeping the procedure time to a reasonable length.

In a second aspect of the present disclosure, there is provided an atherectomy device for cutting or abrading tissue comprising a control handle according to any of the above clauses; a rotatable drive shaft connected to the drive module; and an abrasive head disposed at the distal end of the drive shaft. The abrasive head is tilted or tilteable with respect to a longitudinal axis of the drive shaft.

In some embodiments, this may result in an atherectomy device which can accurately, quickly and thoroughly treat a lesion by automatically rotating the abrasive head by a pre-determined amount.

Throughout this disclosure, the terms 'tilted' and 'tilteable' with respect to the abrasive head are used to describe the position of the abrasive head being offset or configured to be offset, respectively, relative to the longitudinal axis of the drive shaft.

The atherectomy device may further comprise an outer catheter sheath which is disposed over the drive shaft.

In some embodiments, this may better protect the rotatable drive shaft.

The outer catheter sheath may be fixed to the drive module such that rotation of the drive module results in rotation of the outer sheath.

In some embodiments, this may allow the outer catheter sheath to rotate together with the drive module by a pre-determined amount.

The distal end of the outer catheter sheath may be configured to bend to allow the abrasive head to tilt with respect to the longitudinal axis.

The distal end of the outer sheath may comprise a pre-bent portion which tilts the abrasive head with respect to the longitudinal axis.

In some embodiments, this may provide a robust and effective way to tilt the abrasive head.

The atherectomy device may further comprise a pull wire attached to the distal end of the outer catheter sheath for tilting the abrasive head.

In some embodiments, this may allow the amount of bending and therefore the amount of tilting of the abrasive head to be controlled.

In a third aspect of the present disclosure, there is provided a method of cutting or abrading tissue using an atherectomy device having a control handle with a rotary indexing mechanism and a drive module rotatably connected to a tilted abrasive head with a rotatable drive shaft. The method comprises inserting the abrasive head into a patient and advancing the abrasive head to the site of a lesion to be treated; activating the drive module to rotate the abrasive head; performing a longitudinal stroke motion with the drive module to cut or abrade a longitudinal section of the lesion; using the rotary indexing mechanism, automatically rotating the drive module and the tilted abrasive head by a pre-determined amount after a longitudinal stroke motion.

BRIEF DESCRIPTION OF THE DRAWINGS

To enable better understanding of the present disclosure, and to show how the same may be carried into effect, reference will now be made, by way of example only, to the accompanying drawings, in which.

DETAILED DESCRIPTION

Figure 1:
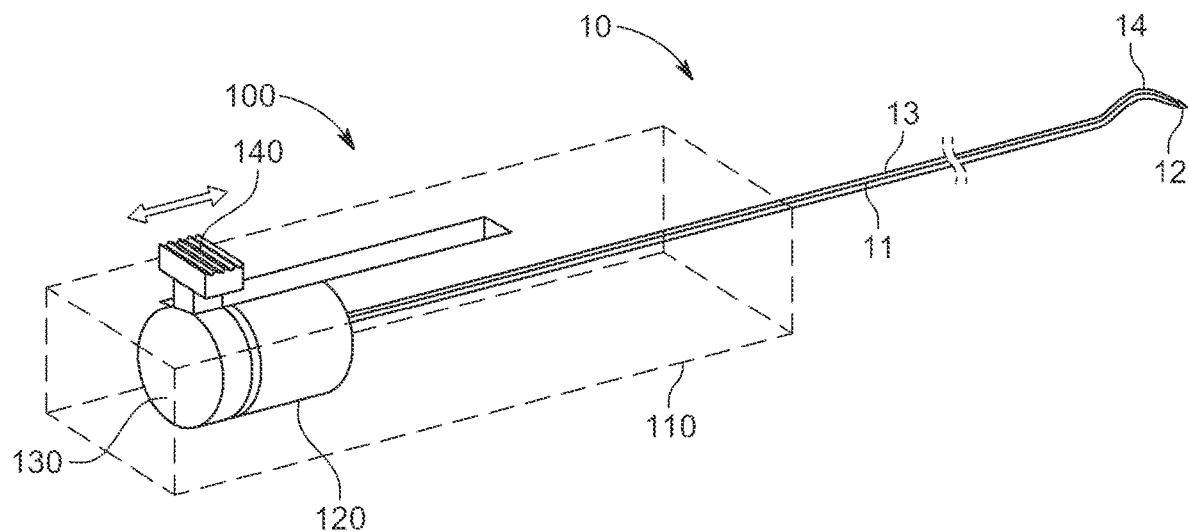
FIG. 1 shows a perspective view of an atherectomy device according to the present disclosure.

FIG. 1 shows a perspective view of an atherectomy device 10. The atherectomy device 10 comprises a rotatable drive shaft 11 having an abrasive head 12 disposed at its distal end. The rotatable drive shaft 11 is disposed within an outer catheter sheath 13. The outer catheter sheath 13 may have a bent portion 14 near the distal end which results in the abrasive head 12 being tilted or offset to one side relative to a longitudinal axis of the drive shaft 11 and outer catheter sheath 13. The bent portion 14 may be a pre-bent portion which is already bent prior to insertion into a patient. Alternatively, the bent portion 14 may be straight when it is inserted into the patient and may only take a bent shape once inside a vessel of the patient. For example, a pull wire may be used to pull the distal end of the outer catheter sheath 13 and thereby create the bent portion 14. Alternatively, a shape memory material, such as nitinol for example, may be embedded into the outer catheter sheath 13 such that the bent portion 14 is formed due to the change in shape of the shape memory material as a result of the change in temperature when the atherectomy device 10 is inserted into a blood vessel of a patient. The rotatable drive shaft 11 and the outer catheter sheath 13 may be made from a flexible material to allow them to better manoeuvre through the blood vessel anatomy and reach a treatment site.

The abrasive head 12 may comprise one or more abrasive surfaces or cutting surfaces which, when rotated, can scrape or cut calcified plaque from the inside of a vessel wall. The abrasive head 12 may be made from a number of materials such as, but not limited to, a cobalt base alloy, oxidised zirconium, or tungsten. The cutting surface may comprise a number of sharp edges which cut the plaque from the wall of the vessel. The abrasive surface may be a rough surface which can grind away the plaque from the walls of the vessel through friction. The abrasive head 12 may comprise a combination of cutting surfaces and abrasive surfaces.

The proximal ends of the rotatable drive shaft 11 and outer catheter sheath 13 are connected to a control handle 100. The control handle 100 comprises a housing 110, a drive module 120, a rotary indexing mechanism 130 and a pusher element 140.

The drive module 120 is disposed within the housing 110 and connected to the rotatable drive shaft 11 such that it can impart rotational motion to the rotational drive shaft 11 and thereby rotate the abrasive head 12. The drive module 120 may be an electric motor, for example, with an axle which is connected to the rotatable drive shaft 11 to impart rotational motion to the rotational drive shaft 11. The outer catheter sheath 13 is connected to the drive module 120 itself such that it rotates together with the whole drive module 120.

The drive module 120 is connected to a rotary indexing mechanism 130 which may also be disposed within the housing 110. The drive module 120 can be moved longitudinally within the housing 110, for example, via pusher element 140 which can be operated by a user. For example, the drive module 120 can be moved in a longitudinal stroke motion consisting of a distal stroke where the drive module 120 is pushed longitudinally in a distal direction, followed by a proximal stroke where the drive module 120 is pushed longitudinally in a proximal direction, or vice versa. After each longitudinal stroke motion, the rotary indexing mechanism 130 automatically rotates the drive module 120 and the connected outer catheter sheath 13, by a pre-determined amount. Due to the bent portion 14 of the outer catheter sheath 13, this will also result in the tilted abrasive head 12 being rotated by the pre-determined amount. The pre-determined amount of rotation can be in the range of 5 degrees to 90 degrees, preferably in the range of 10 degrees to 60 degrees.

Figure 2A:
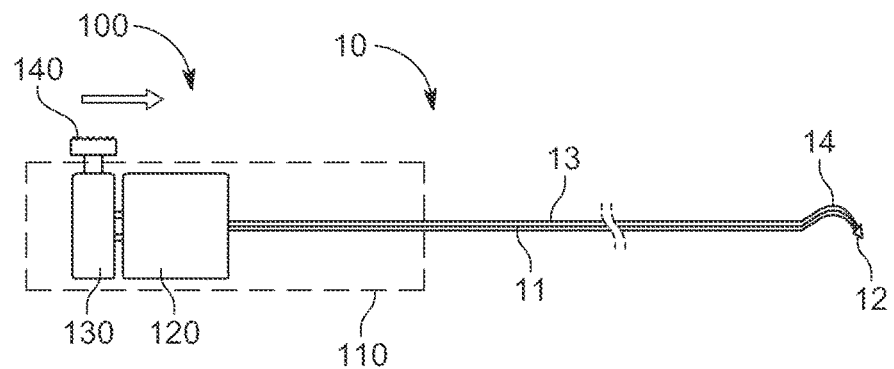
FIG. 2A shows a side view of the atherectomy device of FIG. 1 prior to a distal stroke.
Figure 2B:
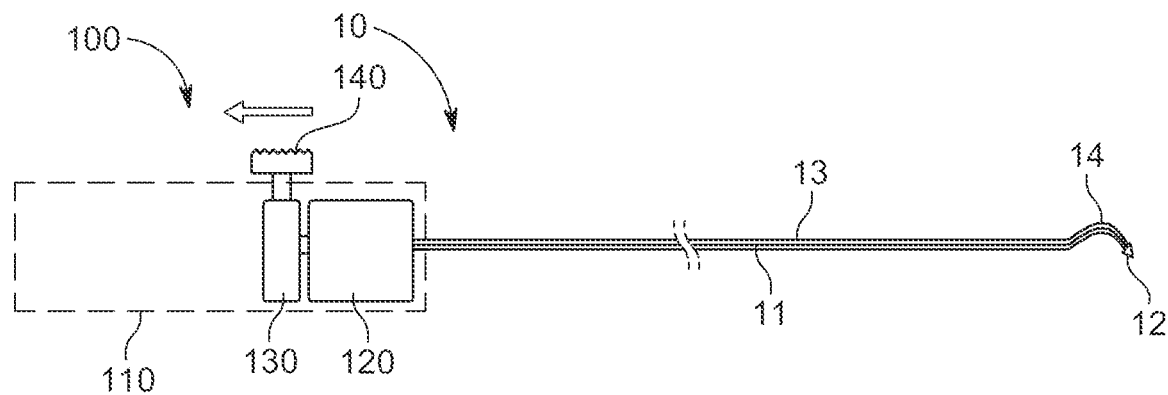
FIG. 2B shows a side view of the atherectomy device of FIG. 1 after a distal stroke.
Figure 2C:
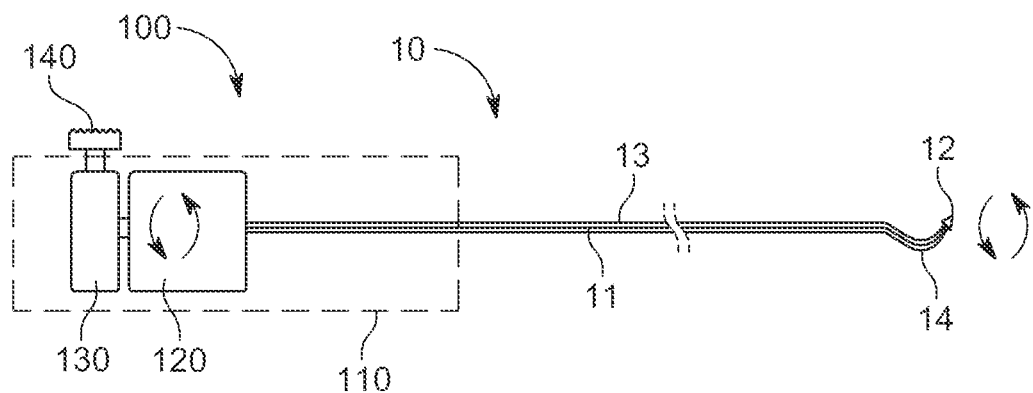
FIG. 2C shows a side view of the atherectomy device of FIG. 1 after a proximal stroke.

FIGS. 2A-C illustrate a method of how the atherectomy device 10 can be operated and used to treat a lesion in a patient.

Firstly, the catheter portion of the atherectomy device 10, i.e. the outer sheath 13 together with abrasive head 12 and rotatable drive shaft 11, can be inserted into the patient's blood vessel through an access site. The catheter portion may then be advanced through the blood vessel anatomy to the lesion where there has been a build-up of plaque in the vessel wall which is to be removed.

The bent portion 14 causes the abrasive head of the catheter to be tilted or offset to one side. The drive module 120 is then activated which causes the rotatable drive shaft 11 and abrasive head 12 to rotate. As shown in FIG. 2A, the user may then push the pusher element 140 and thereby the drive module 120 longitudinally in a distal direction to perform a distal stroke. This results in the abrasive head 12 advancing in a distal direction and cutting or abrading the plaque from the vessel wall along a longitudinal portion of the lesion.

The end of the distal stroke may be reached, for example, when the drive module 120 has reached the end of the housing 110 or when the abrasive head 12 has reached the end of the lesion. Once the end of the distal stroke is reached, as shown in FIG. 2B, the pusher element 140 is then pulled back in a proximal direction to perform a proximal stroke and complete a longitudinal stroke motion. The proximal stroke results in the drive module 120 and the abrasive head 12 being pulled back in a proximal direction.

At the end of the proximal stroke, as shown in FIG. 2C, the rotary indexing mechanism 130 rotates the drive module 120 by a pre-determined amount. Because the drive module 120 is connected to the outer catheter sheath 13, the outer catheter sheath 13 with bent portion 14 rotates together with the drive module 120 by the pre-determined amount. This therefore changes the radial angle at which the abrasive head 12 is offset or tilted by the pre-determined amount. The abrasive head 12 is then ready to treat a new longitudinal portion of the lesion.

These steps can be repeated until the drive module 120 and abrasive head 12 have been rotated by 360 degrees and the whole circumference of the lesion has been treated. This method can be especially useful for treating larger diameter vessels, where entire abrasive head 12 cannot treat the full circumference of the vessel in one axial pass.

The automatic rotation of the drive module 120 and abrasive head 12 by a pre-determined amount after a longitudinal stroke motion therefore allows a lesion to be treated more quickly, accurately and thoroughly than for previous devices.

Figure 3:
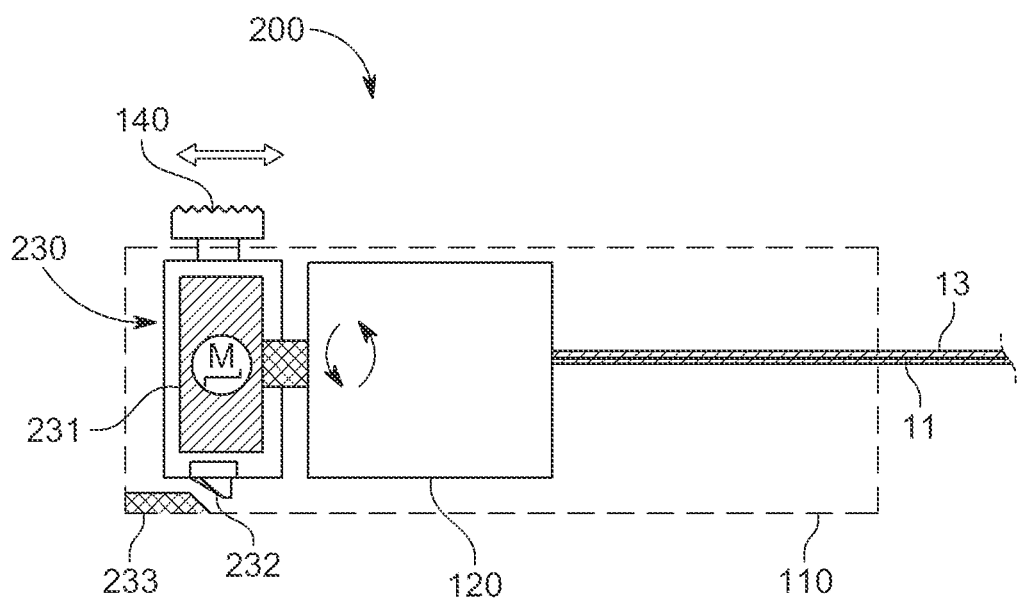
FIG. 3 shows a cross-sectional side view of a control handle for an atherectomy device according to the present disclosure.

FIG. 3 shows an embodiment of a control handle 200 which may be used as part of atherectomy device 10, as described with respect to FIG. 1 and FIGS. 2A-C above. The same reference numerals will be used herein to refer to features which are identical across different embodiments.

Control handle 200 comprises a housing 110, a drive module 120, a rotary indexing mechanism 230 and a pusher element 140. A rotatable drive shaft 11 may be connected to the drive module 120 such that the drive module 120 can impart rotational motion to the rotatable drive shaft 11. An outer catheter sheath 13 may be fixed to the drive module 120 such that it rotates together with the whole drive module 120, as explained for FIG. 1 above.

The rotary indexing mechanism 230 of FIG. 3 comprises a stepper motor 231 and a microswitch 232 for activating the stepper motor 231. The stepper motor 231 is connected to the drive module 120 such that the drive module 120 will be rotated by a pre-determined amount every time the stepper motor 231 is activated by the microswitch 232.

The housing 110 may comprise an internal ledge or protrusion 233. This internal protrusion 233 may be positioned near the proximal end of the housing 110 and may come into contact with the microswitch 232 to activate the stepper motor 231 at the end of a proximal stroke.

Pusher element 140 may be connected to the stepper motor 231 and may extend at least party outside the housing 110 to allow a user to move the stepper motor 231 and the connected drive module 120 in a longitudinal stroke motion. The control handle 200 can be used as part of an atherectomy device 10 in the same manner as described with respect to FIGS. 2A-C above. The stepper motor 231 and drive module 120 can be moved in a longitudinal stroke motion via the pusher element 140. At the end of a proximal stroke, the microswitch 232 is triggered by the internal protrusion 233 and rotates the drive module 120 by a pre-determined amount. Another longitudinal stroke motion can then be performed, and these steps can be repeated until the stepper motor 231 has rotated the drive module 120 through 360 degrees and the entire circumference of the lesion has been treated.

Figure 4A:
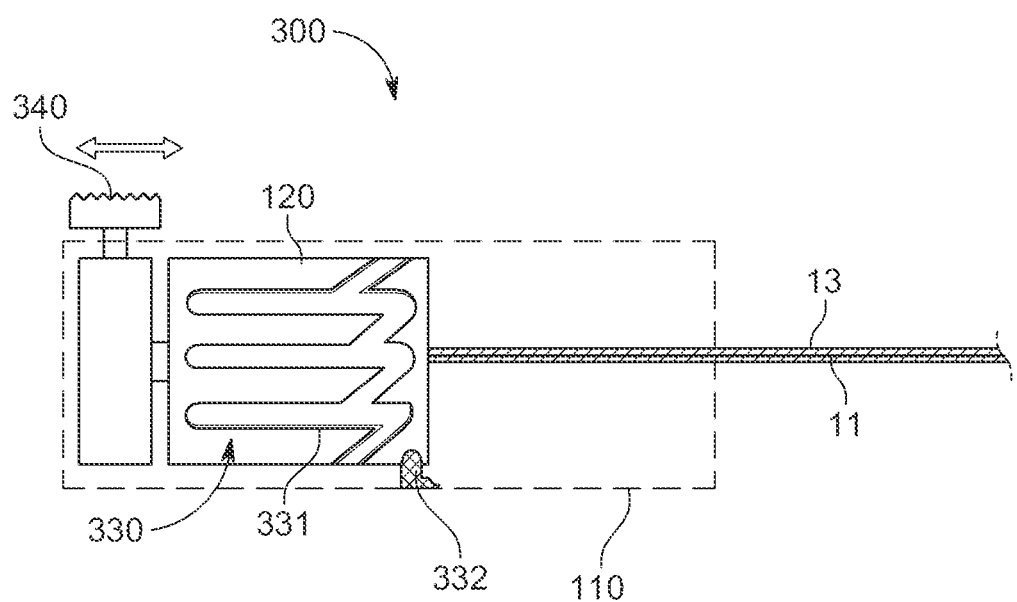
FIG. 4A shows a cross-sectional side view of an alternative embodiment of a control handle for an atherectomy device according to the present disclosure.

FIG. 4A shows another embodiment of a control handle 300 which may be used as part of atherectomy device 10, as described with respect to FIG. 1 and FIGS. 2A-C above. Again, the same reference numerals will be used for features which are identical across different embodiments.

The control handle 300 comprises a housing 110 and a drive module 120, a rotary indexing mechanism 330, and a pusher element 340. A rotatable drive shaft 11 may connected to the drive module 120 such that the drive module 120 can provide rotation to the rotatable drive shaft 11. An outer catheter sheath 13 may be fixed to the drive module 120 such that it rotates together with the whole drive module 120, as explained for FIG. 1 above.

The rotary indexing mechanism 320 of FIG. 4A is a cam and follower mechanism which comprises a cam track 331 and a follower 332. The cam track 331 may be disposed on the outer surface of the drive module 120, which may have a cylindrical shape. For example, the cam track 331 may be moulded into the outer surface of the drive module 120. The cam track 331 may be in the form of a recessed or slotted track. The follower 332 may be in the form of a protrusion which is fixed to the inside of the housing 110 and may be engaged with the cam track 331 such that it follows the path of the cam track 331.

The pusher element 340 may extend into the housing 110 and the drive module 120 may be directly rotatably connected to the pusher element 340. A longitudinal stroke motion of the pusher element 340 therefore results in a corresponding longitudinal stroke motion of the drive module 120. Because the follower 332 is fixed to the housing and engages the cam track 331 which is disposed on the drive module 120, the drive module 120 will be rotated by a pre-determined amount after a longitudinal stroke motion.

The cam track 331 may extend around the whole circumference of the drive module 120, to allow the drive module 120 to rotate through 360 degrees and therefore allow the whole circumference of the lesion to be treated.

Figure 4B:
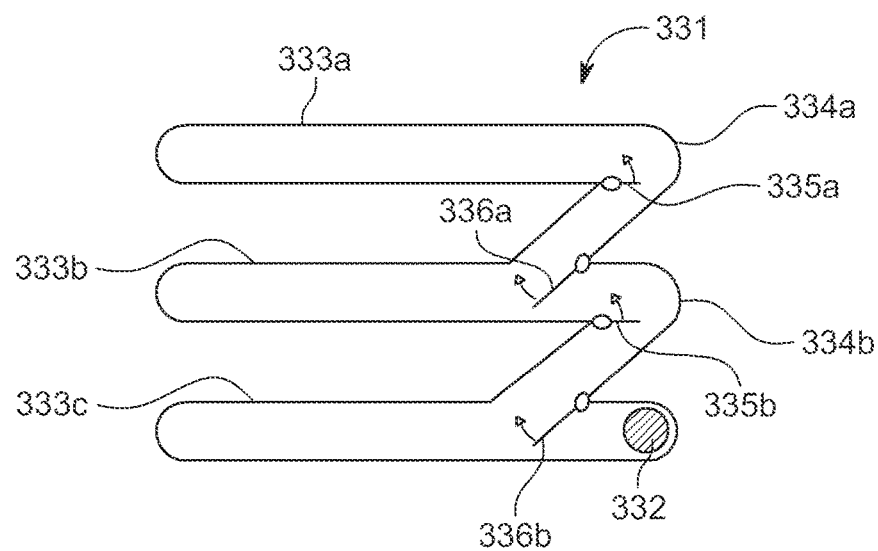
FIG. 4B shows a close-up view of the cam track of the control handle of FIG. 4A.

FIG. 4B shows a partial portion of the cam track 331. The cam track 331 comprises a number of longitudinal straight portions 333, which extend longitudinally along the drive module 120. FIG. 4B shows a first, second and third longitudinal straight portions 333a, 333b, 333c, however, the cam track 331 may have fewer or more longitudinal straight portions 333 than that. For example, the cam track 331 may have in the range of 2 to 20 longitudinal straight portions 333, preferably in the range of 4 to 10 longitudinal straight portions 333.

Each longitudinal straight portion 333 may be connected to an adjacent longitudinal straight portion 333 with a v-shaped portion 334. For example, the first longitudinal straight portion 333a may be connected to the second longitudinal straight portion 333b via a first v-shaped portion 334a. Similarly, the second longitudinal straight portion 333b may be connected to the third longitudinal straight portion via a second v-shaped portion 334b. The v-shaped portions 334 may be disposed at the distal end of the longitudinal straight portions 333. The gap between the longitudinal straight portions 333 determines the pre-determined amount that the drive module 120 will rotate after each longitudinal stroke.

The follower 332, which is fixed to the housing 110, is positioned within or engaged with the cam track 331. When the drive module 120 is moved in a longitudinal stroke motion via the pusher element 140, the follower 332 follows the path of the cam track 331. Initially, the drive module 120 may be disposed at the proximal end of the housing 110 such that the follower 332 is disposed at the distal end of the cam track 331, as shown in FIG. 4B. When a distal stroke is performed, the drive module 120 moves distally within the housing 110 while the follower 332 moves proximally along the longitudinal straight portion 333c. When a proximal stroke is performed, the drive module 120 moves back in a proximal direction, while the follower 332 moves distally along the longitudinal straight portion 333c and then enters the v-shaped portion 334b which connects the two adjacent longitudinal straight portions 333c and 333b. This results in the drive module 120 rotating by a pre-determined amount corresponding to the distance between the two longitudinal straight portions 333c and 333b. These steps can then be repeated until the drive module 120 has been rotated through 360 degrees.

In order to assist the follower 332 move within the cam track 331 in the right direction, the cam track 331 comprises a number of one-way gates. Each v-shaped portion 334 may have a one-way gate 335 positioned at the tip of its v shape. For example, the first v-shaped portion 334a may have a first one-way gate 335a at its tip. Similarly, the second v-shaped portion 334b may have a second one-way gate 335b at its tip.

These one-way gates 335 help the follower 332 move along the correct leg of the v-shaped portion at the beginning of a distal stroke. Furthermore, the cam track 331 may include a one-way gate 336 at each point where a v-shaped portion 334 connects to a longitudinal straight portion 333. For example, a third one-way gate 336a may be positioned at the point where the first v-shaped portion 334 connects to the second longitudinal straight portion 333b. Similarly, a fourth one-way gate 336b may be positioned at the point where the second v-shaped portion 334b connects to the third longitudinal straight portion 333c. These one-way gates 336 may help the follower move from a longitudinal straight portion 333 into a v-shaped portion 334 at the end of a proximal stroke and therefore help to ensure that the drive module 120 is rotated by a pre-determined amount at the end of a proximal stroke.

The method of using the control handle 300 as part of an atherectomy device 10 to treat a lesion is the same as described for FIGS. 2A-C above.

Figure 5A:
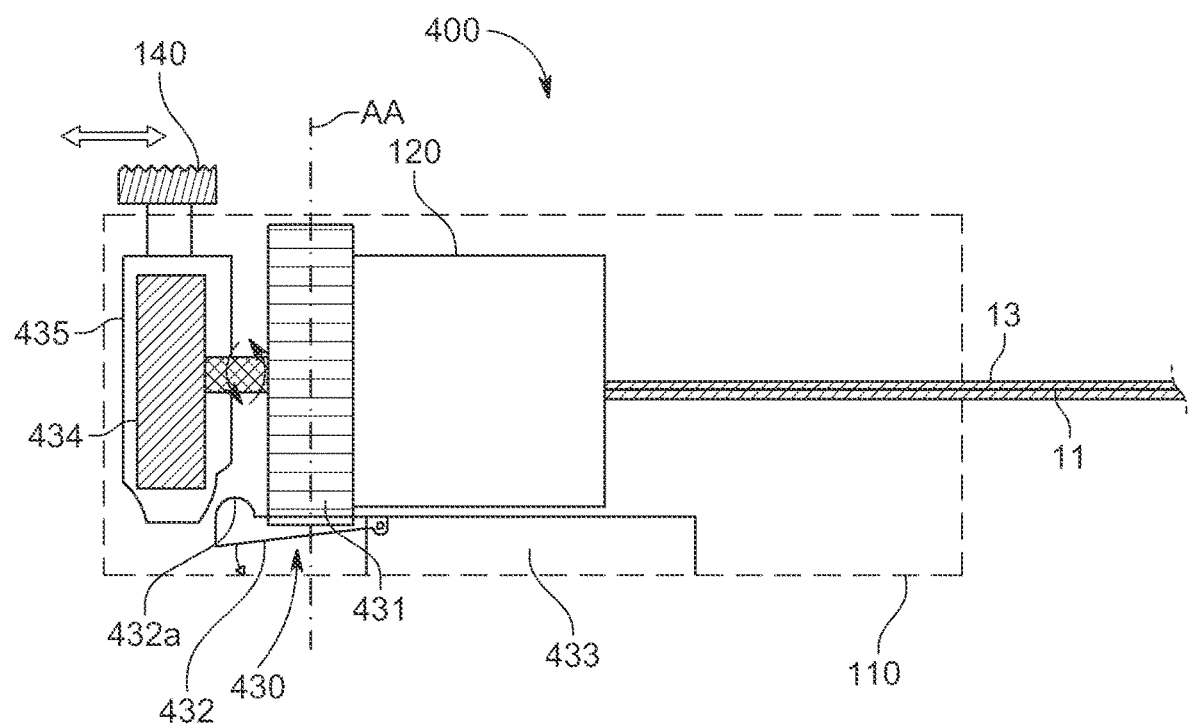
FIG. 5A shows a cross-sectional side-view of an alternative embodiment of a control handle for an atherectomy device according to the present disclosure.

FIG. 5A shows another embodiment of a control handle 400 which may be used as part of atherectomy device 10, as described with respect to FIG. 1 and FIGS. 2A-C above. Again, the same reference numerals will be used for features which are identical across different embodiments.

Control handle 400 comprises a housing 110, a drive module 120, a rotary indexing mechanism 430 and a pusher element 140. A rotatable drive shaft 11 may be connected to the drive module 120 such that the drive module 120 can rotate the rotatable drive shaft 11. An outer catheter sheath 13 may be fixed to the drive module 120 such that it rotates together with the whole drive module 120, as explained for FIG. 1 above.

The rotary indexing mechanism 430 of FIG. 5A comprises a ratchet and pawl mechanism. A ratchet 431 may be fixed to the outside surface of the drive module 120. A pawl, in the form of a longitudinal pawl rail 433 and a pivotable element 432, may be connected to the housing 110. The longitudinal pawl rail 433 may be fixed to the housing 110 and may extends longitudinally along the housing 110. At its proximal end, the longitudinal pawl rail 433 may be connected to the pivotable element 432 which can pivot downwards. The ratchet 431 may comprise a number of teeth 431a, 431b, 431c (shown in FIG. 4B) which can engage the pivotable element 432 or the longitudinal pawl rail 433 and prevent the ratchet 431 and the drive module 120 from rotating whilst one of the teeth 431a, b, c, is engaged with the pivotable element 432 or the longitudinal pawl rail 433. The control handle 400 further comprises a torsion spring mechanism 434 which may be disposed in a housing 435. The drive module 120 may be rotatably connected to the torsion spring mechanism 434. The torsion spring mechanism 434 can be wound up to store mechanical energy and provide rotational motion to the drive module 120 when the pivotable element 432 is released from engagement with the ratchet 431. The pusher element 140 may be connected to the torsion spring mechanism 434.

When using the control handle 400, initially, the drive module 120 may be positioned at the proximal end of the housing 110. One of the teeth, e.g. tooth 431a shown in FIG. 4B, of the ratchet 431 may be engaged with the pivotable element 432 such that the ratchet 431 and drive module 120 cannot rotate. During a distal stroke, when the drive module 120 is pushed in a distal direction via pusher element 140, the tooth 431a remains engaged with the longitudinal pawl rail 433 such that there is no rotation of the ratchet 431. After the distal stroke, the drive module 120 can be pulled back in a proximal direction via pusher element 140, i.e. a proximal stroke. During the initial part of the proximal stroke, the tooth 431a remains engaged with the longitudinal pawl rail 433 such that there is no rotation of the ratchet 431. Towards the end of the proximal stroke, the tooth 431a of the ratchet comes into engagement with the pivotable element 432. Once the tooth 431a of the ratchet 431 is engagement with the pivotable element 432, the housing 435 of the torsion spring mechanism 434 may push the pivotable element 432 downwards such that it is temporarily released from engagement with the tooth 431a. For example, the pivotable element 432 may have a protrusion 432a which temporarily engages with the housing 435 of the torsion spring mechanism 434 to push the pivotable element 432 downwards.

While the pivotable element 432 is temporarily disengaged from the ratchet 431, the torsion spring mechanism 434 rotates the ratchet 431 and drive module 120. A spring mechanism may then push the pivotable element 432 back up to engage an adjacent tooth, e.g. tooth 431b shown in FIG. 4B, of the ratchet 431. This results in the ratchet 431 and the drive module 120 rotating by a pre-determined amount at the end of a longitudinal stroke motion. The spring mechanism may be disposed in the pivot or underneath the pivotable element 432, for example. These steps can then be repeated until the drive module 120 has been rotated through 360 degrees and the entire circumference of the lesion has been treated.

The method of using the control handle 300 as part of an atherectomy device 10 which can be used to treat a lesion is the same as described for FIGS. 2A-C above.

Figure 5B:
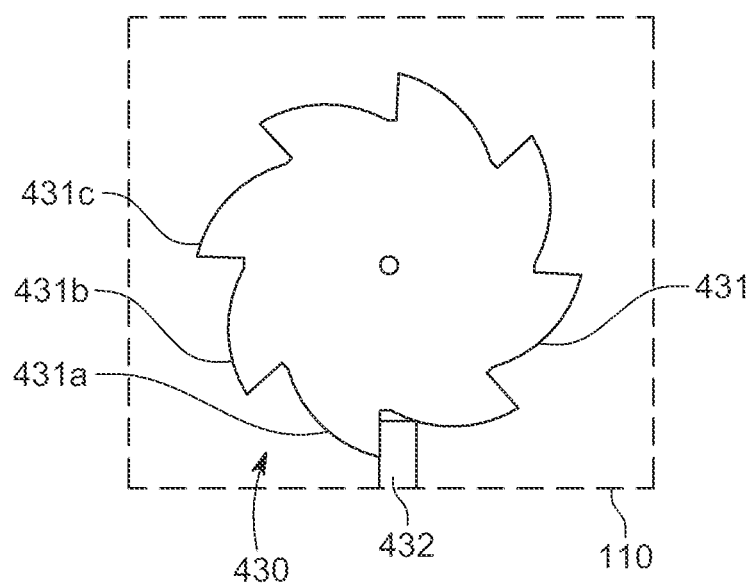
FIG. 5B shows a cross-sectional view of the control handle of FIG. 5A along line AA.

FIG. 5B shows a cross-sectional view of the control handle along line AA of FIG. 5A.

FIG. 5B shows the teeth 431a, 431b, 431c of the ratchet 431 and how they can engage the pivotable element 432 in order to prevent the ratchet 431 from rotating. FIG. 5B shows the ratchet 431 having seven teeth, however, the number of teeth of the ratchet 431 may be higher or lower. For example, the ratchet 431 may have in the range of 2 to 20 teeth, preferably in the range of 4 to 10 teeth. The number of teeth and the spacing between the teeth determines the pre-determined amount that the drive module rotates after each longitudinal stroke motion. The higher the number of teeth, the smaller the amount of pre-determined rotation after a longitudinal stroke motion.

Various modifications will be apparent to those skilled in the art.

The bent portion 14 may be a pre-bent portion or it may be a portion which only becomes bent once the device is inside a patient's body.

The drive module 120 may be any device which can impart rotation to a rotatable drive shaft 11 and is not limited to only an electric motor.

The control handle 100 may not comprise a manual pusher element 140.

For control handle 200, the microswitch 232 may be placed at any suitable position which allows it to be triggered after a longitudinal stroke motion. For example, the microswitch 232 could be positioned at the back of the stepper motor 231.

Similarly, the protrusion 233 in the housing 110 can be positioned in any suitable place for example, at the distal end of the housing 110. Alternatively, the housing may not have a protrusion 233.

The control handle 200 may not have a manual pusher element 140.

For control handle 300, the cam track 331 may not be positioned on the outside of the drive module 120. For example, the cam track could be positioned on the inside of the housing 110 and the follower 332 positioned on the drive module 120.

The follower 332 may not be fixed to the inside of the housing 110 but could be fixed to the drive module, for example.

The cam track 331 may not be moulded to the drive module 120 but may be attached in any other suitable manner.

The v-shaped portions 334 may be disposed at the proximal ends of the longitudinal straight portions 333.

The cam track 331 may not comprise any one-way gates 335 at the tip of the v-shaped portions.

The cam track 331 may not comprise any one-way gates 336 at the points where the v-shaped portions 334 connect to the longitudinal straight portions 333.

The cam track 331 may not extend around the entire circumference of the drive module 120.

For the control handle 400, the pivotable element 432 may be connected at the distal end of the longitudinal pawl rail 433.

The torsion spring mechanism 434 may be any other type of mechanism which can impart rotational motion onto the ratchet 431 and the drive module 120.

The ratchet 431 may be fixed to the housing 110 with the longitudinal pawl rail 433 and pivotable element 432 connected to the drive module 120.

The pivotable element 432 may not comprise a protrusion 432a.

All of the above are fully within the scope of the present disclosure and are considered to form the basis for alternative embodiments in which one or more combinations of the above described features are applied, without limitation to the specific combination disclosed above.

In light of this, there will be many alternatives which implement the teaching of the present disclosure. It is expected that one skilled in the art will be able to modify and adapt the above disclosure to suit its own circumstances and requirements within the scope of the present disclosure, while retaining some or all technical effects of the same, either disclosed or derivable from the above, in light of his common general knowledge in this art. All such equivalents, modifications or adaptations fall within the scope of the present disclosure.

The invention claimed is:

1. A control handle for an atherectomy device comprising:
   a housing;
   a drive module positioned within the housing for rotating an abrasive head of the atherectomy device, the drive module being moveable relative to the housing in a longitudinal stroke motion, wherein the longitudinal stroke motion is driven by a pusher element extending at least partly outside the housing;
   a rotatable drive shaft, wherein a proximal end of the rotatable drive shaft is connected to the drive module and a distal end of the rotatable drive shaft is connected to the abrasive head; and
   a rotary indexing mechanism connected to the drive module, wherein the rotary indexing mechanism is configured to rotate the drive module by a pre-determined amount after a longitudinal stroke, wherein the pre-determined amount of rotation is in the range of 5 degrees to 90 degrees.

2. The control handle of claim 1, wherein the rotary indexing mechanism comprises a stepper motor for rotating the drive module and a microswitch for activating the stepper motor.

3. The control handle of claim 2, wherein the microswitch is positioned such that it is triggered by a portion of the housing after a longitudinal stroke.

4. The control handle of claim 2, wherein the housing comprises an internal protrusion for contacting and triggering the microswitch after a longitudinal stroke.

5. The control handle of claim 4, wherein the internal protrusion is positioned to trigger the microswitch at the end of a proximal stroke.

6. The control handle of claim 1, wherein the rotary indexing mechanism comprises a cam track and follower.

7. The control handle of claim 6, wherein the cam track is disposed on the drive module.

8. The control handle of claim 6, wherein the follower is fixed to the inside of the housing.

9. The control handle of claim 6, wherein the follower comprises a protrusion which engages with the cam track.

10. The control handle of claim 6, wherein the cam track comprises a plurality of longitudinal straight portions and a plurality of v-shaped portions.

11. The control handle of claim 10, wherein each longitudinal straight portion is connected to an adjacent longitudinal straight portion through a v-shaped portion.

12. The control handle of claim 10, wherein each of the plurality of v-shaped portions is disposed at the distal end of one of the plurality of longitudinal straight portions.

13. The control handle of claim 10, wherein the cam track comprises a one-way gate at one or more of the points where one of the v-shaped portions connects to one of the longitudinal straight portions.

14. The control handle of claim 13, wherein the cam track comprises a one-way gate at each point where one of the v-shaped portions connects to one of the longitudinal straight portions.

15. The control handle of claim 10, wherein the cam track comprises a one-way gate at the tip of at least one of the plurality of v-shaped portion.

16. The control handle of claim 15, wherein the cam track comprises a one-way gate at the tip of each of the plurality of v-shaped portion.

17. The control handle of claim 1, wherein the rotary indexing mechanism comprises a ratchet and a pawl.

18. The control handle of claim 17, wherein the ratchet is fixed to the drive module and the pawl is disposed in the housing.

19. The control handle of claim 17, wherein the ratchet comprises a plurality of teeth for engaging with the pawl.

20. The control handle of claim 17, wherein the pawl is configured to be released from the ratchet at the end of a longitudinal stroke to allow the drive module to rotate by the pre-determined amount.

21. The control handle of claim 17, wherein the rotary indexing mechanism further comprises a torsion spring mechanism for rotating the drive module.

22. The control handle of claim 17, wherein the pawl comprises a longitudinal pawl rail and a pivotable element.

23. The control handle of claim 22, wherein the pivotable element is disposed at the proximal end of the longitudinal pawl rail.

24. The control handle of claim 22, wherein the pivotable element is configured to pivot and release the ratchet at the end of a longitudinal stroke to allow the drive module to rotate by the pre-determined amount.

25. The control handle of claim 1, wherein the pre-determined amount of rotation is in the range of 10 degrees to 60 degrees.

26. An atherectomy device for cutting or abrading tissue comprising:

the control handle of claim 1;

and the abrasive head disposed at the distal end of the rotatable drive shaft, wherein the abrasive head is tilted or tilteable with respect to a longitudinal axis of the rotatable drive shaft.

27. The atherectomy device of claim 26, further comprising an outer catheter sheath which is disposed over the drive shaft.

28. The atherectomy device of claim 27, wherein the outer catheter sheath is fixed to the drive module such that rotation of the drive module results in rotation of the outer sheath.

29. The atherectomy device of claim 27, wherein the distal end of the outer catheter sheath is configured to bend to allow the abrasive head to tilt with respect to the longitudinal axis.

30. The atherectomy device of claim 27, wherein the distal end of the outer catheter sheath comprises a pre-bent portion which tilts the abrasive head with respect to the longitudinal axis.

31. The atherectomy device of claim 27, further comprising a pull wire attached to the distal end of the outer catheter sheath for tilting the abrasive head.

\* \* \* \* \*